(12) United States Patent
Kave

(10) Patent No.: US 11,058,052 B2
(45) Date of Patent: Jul. 13, 2021

(54) DEVICE AND METHOD FOR CUTTING VEGETATION WITH ROTATABLE TURRET

(71) Applicant: Dennis Matthew Kave, Henrico, VA (US)

(72) Inventor: Dennis Matthew Kave, Henrico, VA (US)

( * ) Notice: Subject to any disclaimer, the term of this patent is extended or adjusted under 35 U.S.C. 154(b) by 0 days.

(21) Appl. No.: 17/064,176

(22) Filed: Oct. 6, 2020

(65) Prior Publication Data

US 2021/0112709 A1 Apr. 22, 2021

Related U.S. Application Data

(60) Provisional application No. 62/973,660, filed on Oct. 17, 2019.

(51) Int. Cl.
*A01D 34/66* (2006.01)
*A01D 34/81* (2006.01)
*A01D 69/02* (2006.01)
*A01D 101/00* (2006.01)

(52) U.S. Cl.
CPC .......... *A01D 34/661* (2013.01); *A01D 34/81* (2013.01); *A01D 69/02* (2013.01); *A01D 2101/00* (2013.01)

(58) Field of Classification Search
CPC ........ A01D 34/81; A01D 34/61; A01D 34/02; A01D 69/02; A01D 2101/00; A01D 34/661
See application file for complete search history.

(56) References Cited

U.S. PATENT DOCUMENTS

| 1,555,011 | A | * | 9/1925 | Keith | A01D 34/84 56/255 |
| 2,926,480 | A | * | 3/1960 | Kimball | A01G 3/04 56/235 |
| 3,835,630 | A | * | 9/1974 | von der Au | A01D 34/76 56/295 |
| 4,622,807 | A | * | 11/1986 | Reymann | A01D 34/6806 56/12.9 |
| 6,966,168 | B1 | * | 11/2005 | Kerr, Sr. | A01D 34/001 56/12.7 |
| 8,857,137 | B2 | * | 10/2014 | Avnery | A01D 34/84 56/10.2 A |
| 2005/0126144 | A1 | | 6/2005 | Koselka et al. | |
| 2018/0146618 | A1 | | 5/2018 | Elazary et al. | |

OTHER PUBLICATIONS

Spec sheet for Bush Hog Flex-Wing Rotary Cutter, 20 pages, available at https://bushhog.com/wp-content/uploads/2020/05/Flex-Wing-Literature-2020_4-9-1.pdf, last accessed Sep. 15, 2020.

(Continued)

*Primary Examiner* — Alicia Torres
(74) *Attorney, Agent, or Firm* — Patent Law of Virginia, PLLC; Brian J. Teague

(57) ABSTRACT

A device for cutting vegetation comprises a base capable of being selectively propelled about a surface upon which the device sits, a turret affixed to the base and rotatable relative to the base, and one or more vegetation cutting tools affixed to the turret. The turret and cutting tools rotate together 360 degrees relative to the base as the base moves about the surface such that the cutting tools are adapted to cut vegetation on the surface.

10 Claims, 4 Drawing Sheets

(56) References Cited

OTHER PUBLICATIONS

Website for ProMow GOLD7 Gold Series 7 Gang Reel Mower 6-Blade, 4 pages, available at https://www.mowersdirect.com/ProMow-GOLD7/p2792.html?gclid=EAlaIQobChMlv5uu6Z3G6wIVxZyzCh1TTw0KEAQYAiABEgljUvD_BwE, ast accessed Sep. 15, 2020.

Website for DR 3-Point Hitch Trimmer Mower, 3 pages, available at https://www.drpower.com/Power-Equipment/Trimmer-Mowers/Tow-Behind/DR-3-Point-Hitch-Trimmer-Mower/p/TT130003PN?gsa=true&ctm_id=TT130003PN&src=AW1AA99XE40633098<gclid=EAlaIQobChMIwJ_J3J7G6wIVAY_ICh2Z8Q8VEAQYASABEgJNpvD_BwE, last accessed Sep. 15, 2020.

International Search Report and Written Opinion for PCT Appl. No. PCT/US2020/054503, dated Jan. 15, 2021, 7 pages.

* cited by examiner

DEVICE AND METHOD FOR CUTTING VEGETATION WITH ROTATABLE TURRET

CROSS-REFERENCE TO RELATED APPLICATIONS

This application claims priority to U.S. Provisional Application Ser. No. 62/973,660, filed Oct. 17, 2019, the contents of which are incorporated herein by reference in its entirety.

FIELD OF THE INVENTION

The present invention relates generally to equipment for cutting vegetation, such as lawn mowers.

BACKGROUND OF THE DISCLOSURE

Several different types of vegetation cutting machines exist, such as lawnmowers, etc. For many decades, these types of machines were typically powered by an internal combustion engine. In recent years, battery-powered electric motors have become more common.

Conventional lawnmowers have a fixed deck, below which rotates a cutting blade. To increase efficiency, some lawnmowers have larger decks to accommodate larger cutting blades, or multiple cutting blades.

BRIEF SUMMARY OF THE DISCLOSURE

In one embodiment of the invention, a device for cutting vegetation comprises a base capable of being selectively propelled about a surface upon which the device sits, a turret affixed to the base and rotatable relative to the base, and one or more vegetation cutting tools affixed to the turret. The turret and cutting tools rotate together 360 degrees relative to the base as the base moves about the surface such that the cutting tools are adapted to cut vegetation on the surface.

The one or more vegetation cutting tools may comprise two or more vegetation cutting tools spaced evenly apart.

Each cutting tool may comprise a motorized cutting blade. Each cutting tool may comprise an electric motor that is selectively operable to actuate the respective cutting blade. Each cutting tool may further comprise an elongated arm having a proximal end and a distal end. The proximal end of each arm is affixed to the turret, and each electric motor and each cutting blade are affixed at the distal end of a respective arm.

Each cutting blade may comprise a selectively rotatable cutting blade, such that, when the electric motors are operated, angular momentum of the motors causes the turret and cutting tools to rotate together relative to the base.

The device may further comprise a selectively operable turret rotation motor that, when operated, causes the turret and cutting tools to rotate together relative to the base.

The proximal end of each arm may be pivotably affixed to the turret such that each arm is capable of pivoting up and down. The device may further comprise one or more arm pivoting mechanisms, with each arm pivoting mechanism configured to move a respective one of the arms up and down. Each of the one or more arm pivoting mechanisms may comprise an electric motor, a hydraulic cylinder, a pneumatic cylinder, or a linear actuator.

The turret may comprise an electrical slip ring having a fixed portion and a rotatable portion. The proximal end of each arm may be affixed to the rotatable portion of the slip ring. The fixed portion of the slip ring may be affixed to the base.

The device may further comprise one or more spacers. Each spacer may be affixed to a respective arm below its respective cutting blade. The spacers may be adapted to contact the surface and maintain a minimum spacing between each respective cutting blade and the surface. Each spacer may comprise one or more casters.

The base may comprise one or more propulsion motors for selectively propelling the base.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
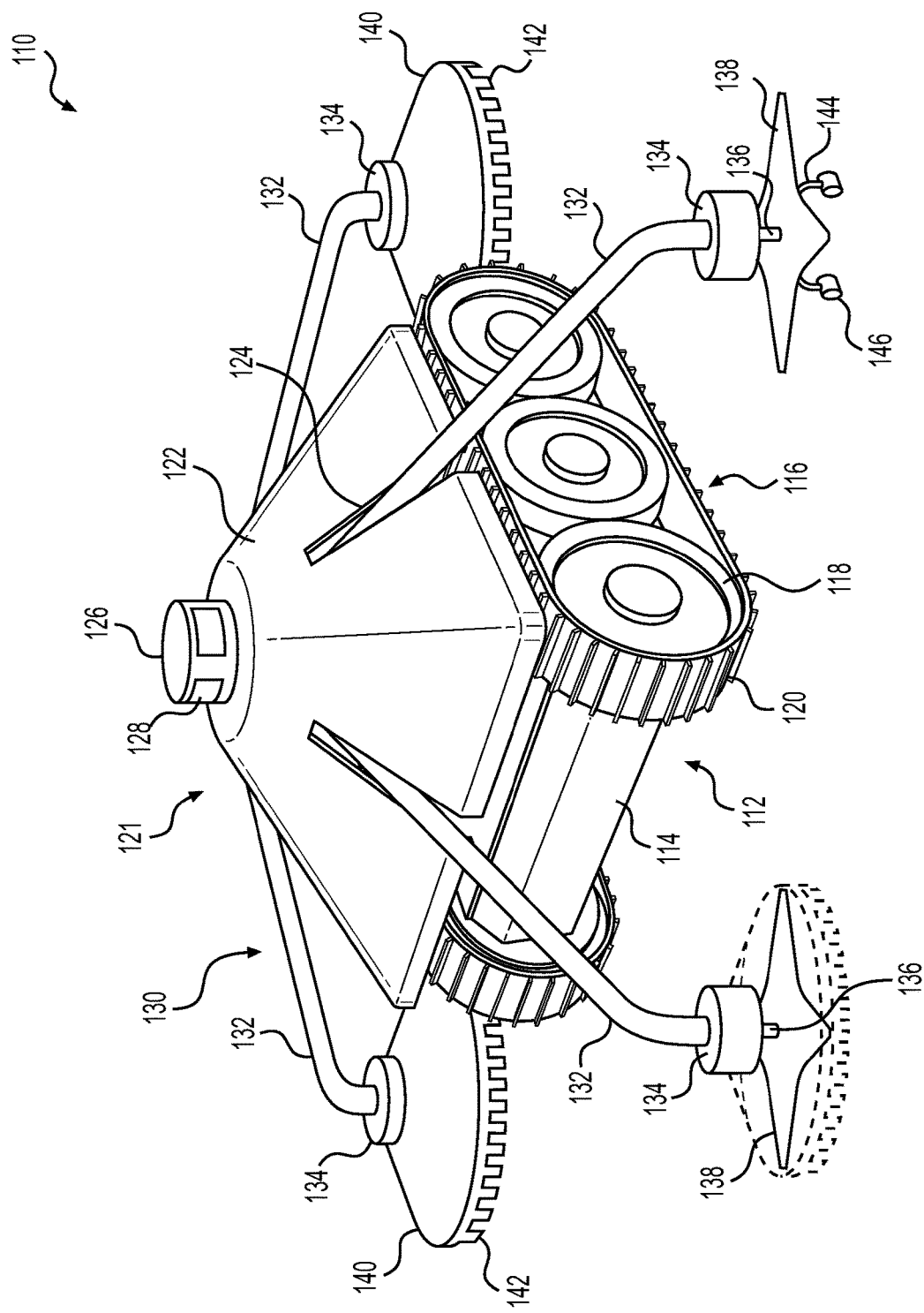
FIG. 1 is a perspective view of a device for cutting vegetation, in accordance with embodiments of the present invention.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise devices and methods for cutting vegetation, such as grass. Embodiments of the invention comprise a vegetation cutting device that has a plurality of vegetation cutting tools on a propelled base. The cutting tools rotate about a Z-axis relative to the base. These rotating cutting tools provide increased cutting efficiency as compared to conventional lawn mowers and the like.

Figure 2:
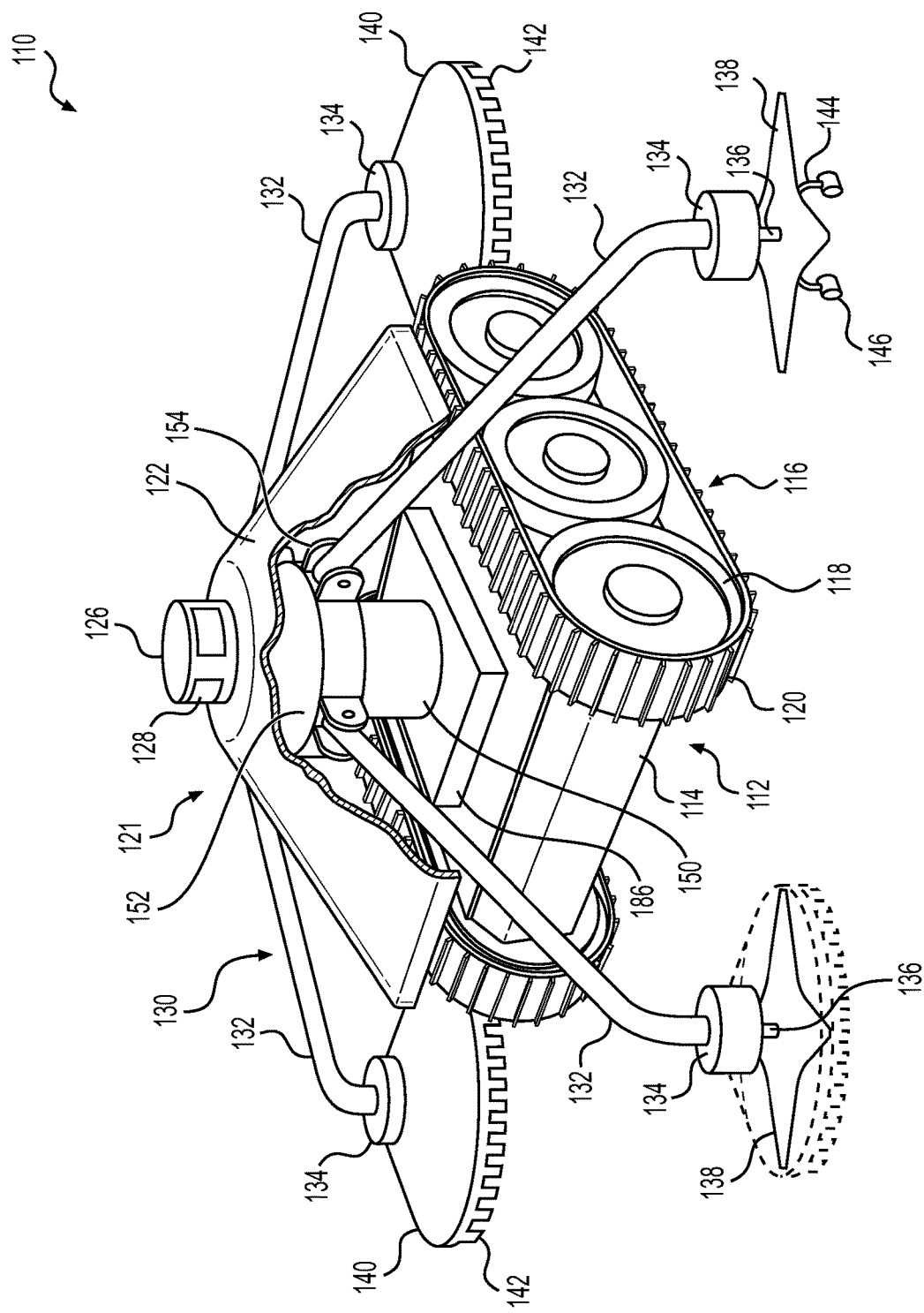
FIG. 2 is a cutaway perspective view of the device for cutting vegetation of FIG. 1.
Figure 3:
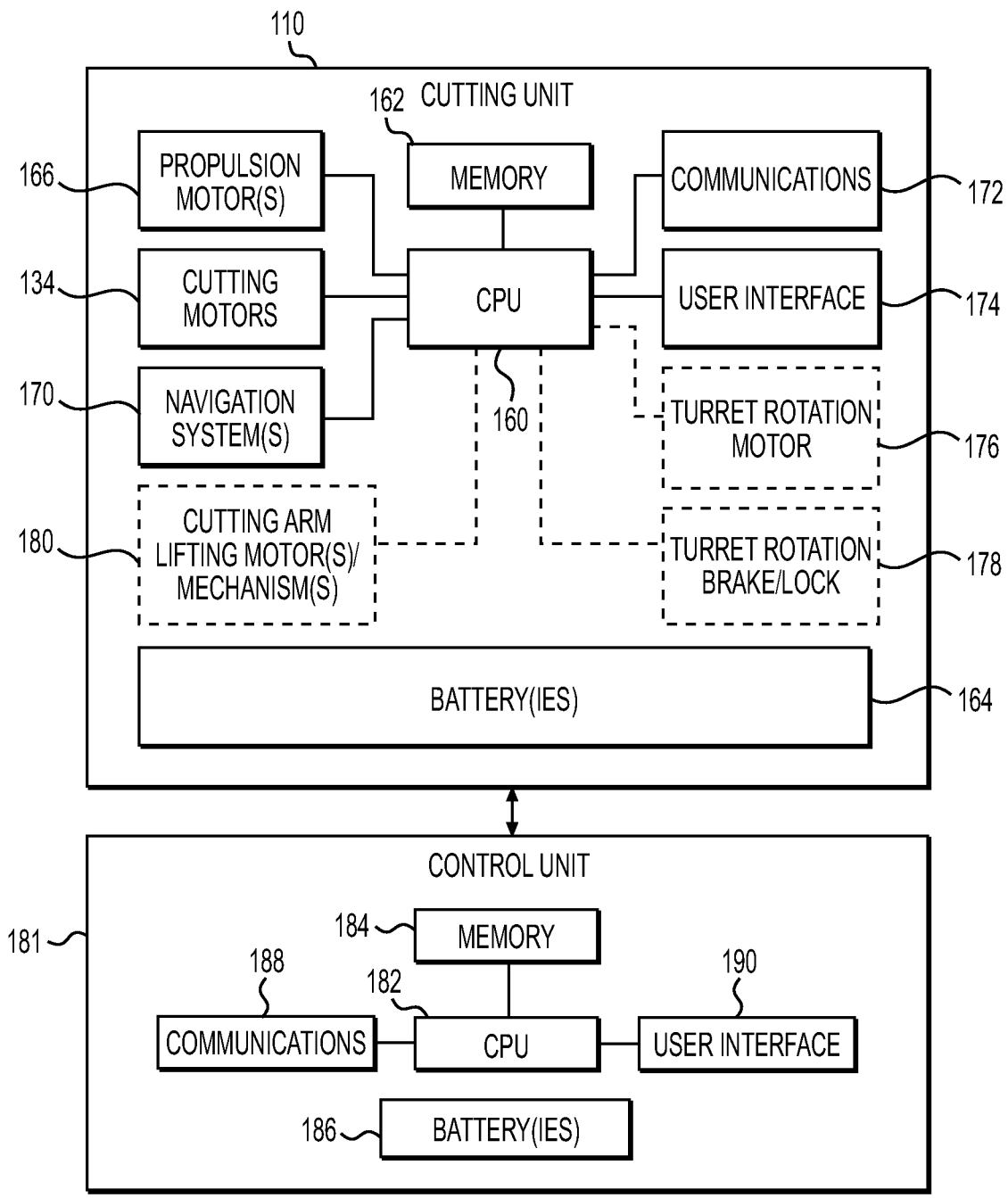
FIG. 3 is a functional block diagram of the device for cutting vegetation of FIG. 1.

Referring now to FIGS. 1-3, a vegetation cutting device 110 comprises a base 112, a turret 121, and one or more vegetation cutting tools 130 (four are shown) affixed to the turret. The base 112 is capable of being selectively propelled about a surface upon which the device sits (e.g., a lawn, field, or the like). The turret 121 is affixed to the base 112 and is rotatable relative to the base 112. The turret 121 and cutting tools 130 rotate together relative to the base 112 as the base 112 moves about the surface such that the cutting tools 130 cut vegetation (e.g., grass) on the surface (in some circumstances the turret 121 and cutting tools 130 rotate together relative to the base 112 even if the base 112 is not moving, or in some circumstances the turret 121 and cutting tools 130 do not rotate relative to the base 112 even if the base 112 is moving).

The base 112 comprises a main body 114 and a track system 116. The main body 114 typically comprises a metal (e.g., steel or aluminum) or strong plastic housing. The track system comprises a plurality of drive wheels 118 and a tank-type tread 120 on each side of the base 112. Such track systems are conventionally known to be used in, e.g., bomb diffusing robots and other similar applications. In the illustrated embodiment, three drive wheels 118 are present on each side of the base 112, however fewer or more wheels may be used. The drive wheels are selectively rotated via one or more propulsion motors 166, which are preferably electric motors powered by one or more batteries 154 which are mounted in or on the base 112. Conventional gearing/belts/chains/etc. may be used to link the propulsion motor(s) 166 to the drive wheels 118. Alternatively, multiple propulsion motors may be used in a direct-drive arrangement with the drive wheels. All or only some of the wheels may be driven; some of the wheels may be simply freely rotatable. The propulsion motor(s) 166 are preferably reversible to rotate the drive wheels in opposite directions to move the device 110 forward or reverse. The propulsion motors 166 are preferably variable speed such that the device 110 may be propelled at different speeds. The variable speed, reversible propulsion motor(s) 166 enables the drive wheels 118 on opposite sides of the base 112 to operate at different speeds and/or in different directions to enable steering control of the device 110 (i.e., similar to steering a tank). The treads 120 enable the device 110 to operate on slopes and on slippery surfaces.

Alternative embodiments may use drive wheels without a track. Other types of propulsion systems may be used, such as hovercraft-like air skirt under the base. In other embodiments of the invention, the device may not have an integrated propulsion mechanism, but may be towed or pushed.

Figure 4:
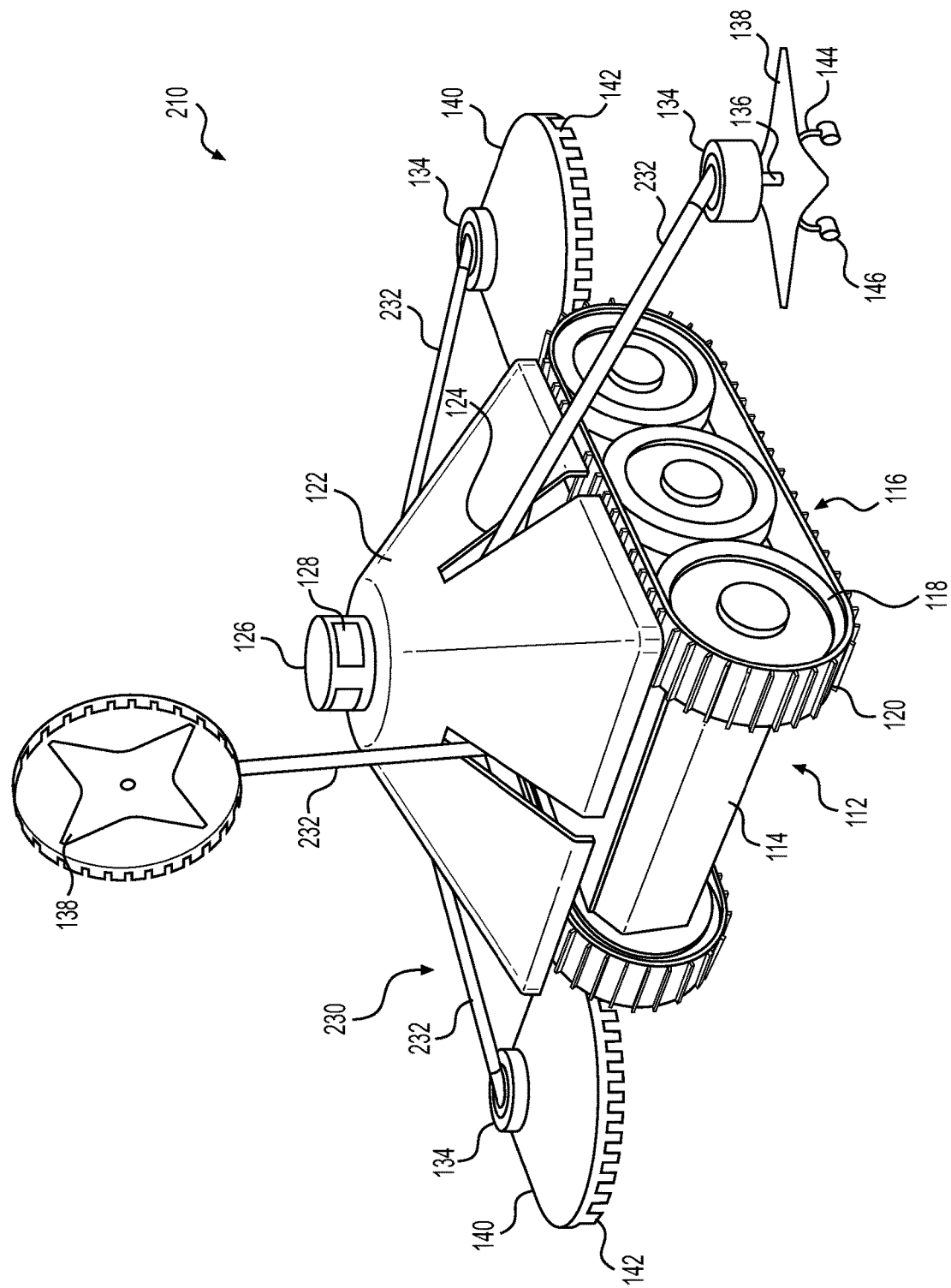
FIG. 4 is a perspective view of a device for cutting vegetation, in accordance with alternative embodiments of the present invention.

Each of the plurality of cutting tools 130 comprises an elongated arm 132 having a proximal end and a distal end. The proximal end of each arm 132 is affixed to the turret 121. In the illustrated embodiment, the proximal end of each arm 132 is pivotably affixed to the turret 121, such as via hinge connections 154, such that each arm is capable of pivoting up and down. In the illustrated embodiment, the arms 130 freely pivot up and down based on the contour of the surface upon which the device is operating. Optionally, the device may comprise one or more arm pivoting mechanisms 180 to move a respective one of the arms 130 up and down. Such a pivoting mechanism may comprise an electric motor, a hydraulic cylinder, a pneumatic cylinder, a linear actuator, or any other suitable mechanism. Whether the arms freely pivot or are pivoted by a pivoting mechanism, each arm is preferably able to pivot independently of the other arms. A securing mechanism (not illustrated) may be included to lock each arm in a desired position (typically fully raised, but other locking positions may be possible). All of the arms may be pivoted fully upward (and potentially locked into that position) (manually or by the pivoting mechanism (if present)) for storage, transport, and while the device is being propelled to the area in which the device is to be operated. One or more arms may be pivoted fully upward (manually or by the pivoting mechanism (if present)) to enable the device to operate in a restricted (e.g., narrow) space (this action would typically be combined with locking the rotation of the turret). FIG. 4 shows one of the arms pivoted fully up. The arms 132 may be constructed of any suitable rigid and strong material, typically aluminum or steel.

At the distal end of each arm 132 is an electric motor 134 that rotates a selectively rotatable cutting blade 138 via motor shaft 136. Any suitable rotatable cutting blade may be used, such as the illustrated star shaped blade, a conventional rectangular lawnmower blade, or even a flexible cutting line such as is used with a conventional string trimmer. The cutting blade is preferably covered by a protective cover 140 that helps prevent injuries, such as from kicked-up rocks (while all of the blades would preferably have such a protective cover, one cover is omitted in each of FIGS. 1, 2 and 4 for clarity). The outer edge of the protective cover 140 may comprise a plurality of teeth 142 with spaces in-between, which helps lift the grass as it is being cut. The protective cover 140 may be constructed of any suitable durable material, such as metal, plastic, or fiberglass.

The illustrated device 110 has four cutting tools 130, however fewer or more cutting tools may be used. In a preferred embodiment, there are either three or four cutting tools. Regardless of the number of cutting tools, it is preferable that the cutting tools be spaced evenly apart on the turret to increase stability as the turret and cutting tools rotate.

The device 110 of FIGS. 1 and 2 has arms 132 that are mostly straight but curved near the distal end such that each arm 132 is affixed to its respective cutting motor 134 at a right angle. In the alternative embodiment of FIG. 4, device 210 is nearly identical to device 110 but with different cutting tool arms. The cutting tools 230 of device 210 have arms 232 that are straight over their entire lengths, such that each arm 232 is affixed to its respective cutting motor 134 at an acute angle. In other alternative embodiments of the invention, any suitable arm shape may be used.

In some embodiments of the invention, the turret is configured to freely rotate relative to the base. As such, when the electric motors 134 are operated and the cutting blades are rotating, the angular momentum of the motors 134 and/or the blades 138 causes the turret 121 and cutting tools 130 to rotate together relative to the base 112. The rotation of the turret is opposite the rotation of the motors/blades. In alternative embodiments of the invention, a selectively operable turret rotation motor 176, when operated, causes the turret and cutting tools to rotate together relative to the base. (The turret rotation caused by a turret rotation motor could be in either direction. As such, a turret rotation motor could cause turret rotation in the same direction as the rotation of the cutting motors/blades (i.e., against the angular momentum).) In either embodiment, during the cutting operation, the cutting tools preferably continuously rotate about the base as the device moves across the surface (unless turret rotation is intentionally stopped, such as to navigate around an obstruction). As mentioned above, these cutting tools rotating around the base provide increased cutting efficiency as compared to conventional lawn mowers and the like. The turret and cutting tools preferably rotate 360 degrees, continuously and in one direction, about the base, however alternative embodiments may rotate the turret and cutting tools about a smaller arc (e.g., the front 180 degrees) and/or in both directions (i.e., back-and-forth). There are at least a couple ways to limit turret rotation to less than 360 degrees and/or to change turret direction while in free-motion mode. For example, a turret rotation motor 176 can enable turret rotation of less than 360 degrees and in one or both directions. As another example, reversible blade rotation motors enable the device to stay balanced like a hovering drone, with half of the blade motors rotating clockwise and half rotating counterclockwise. This technique may be used to stop rotation of the turret, or to enable a back-and-forth oscillation of the turret. Such a back-and-forth oscillation of the turret may be used, for example, when cutting a narrow area, with the two "side" cutting arms raised and the "front" and back" cutting arms oscillating within an arc (e.g., 30 degrees) in front of and behind the device. The CPU 160 and a turret position sensor (not illustrated) can precisely detect and configure the position of the cutting blade(s) relative to the base. Changes/corrections in the turret rotational position (whether small position corrections or larger side-to-side oscillations) may be accomplished by small differentials in blade speeds of the clockwise motors relative to the counterclockwise motors (all of the blades should still be in the range needed to cut (typically at or near 3,000 rpm), but the CPU could (for example) allocate voltage to have two blades rotate at 3,200 rpm clockwise and two blades rotate at 2,800 counterclockwise to generate a gentle counterclockwise deck rotation until the blades are positioned as needed given obstacles, etc.).

The device 110 may comprise a brake or lock mechanism 178 to stop/prevent rotation of the turret 121.

A spacer may be affixed to each arm 132 below its respective cutting blade 138. The spacers contact the surface as the cutting tools rotate to maintain a minimum spacing between each respective cutting blade and the surface. In the illustrated embodiment, the spacer comprises a plurality of casters 146 (two are visible, but three or four casters are preferable), each caster mounted below the cutting blade 138 on a respective leg 144.

In addition to the rotational cutting blades described above, other non-rotational motorized cutting blades may be used. For example, reciprocating cutting blades (similar to a conventional electric hedge trimmer) (not illustrated) may be used.

The rotating turret 121 comprises a shroud 122 that covers and protects some of the components. The shroud 122 may be constructed of any suitable durable material, such as metal, plastic, or fiberglass. Elongated slots 124 are defined in the shroud 122 to enable the arms 132 to protrude and to pivot up and down.

The device comprises one or more batteries 164 (typically mounted in the base 112 to power the propulsion motor(s) 166 and the cutting tool motors 134. Any suitable number, type, and capacity of batteries may be used. To carry the power from the batteries in the base 112 to the cutting tool motors 134, an electrical slip ring is used. The slip ring comprises a fixed portion 150 affixed to the base 112 (such as via mounting adapter 186) and a rotating portion 152. The proximal ends of the arms 132 are affixed to the rotating portion 152. Electrical power is carried from the batteries to the fixed portion 150 via electrical wires (not illustrated). Electrical power flows from the fixed portion 150 to the rotating portion 152 of the slip ring as is conventionally known. Electrical power flows from the rotating portion 152 of the slip ring to the cutting tool motors 134 via electrical wires (not illustrated) concealed in the arms 132.

The turret 121 may be said to comprise at least the rotating portion 152 of the slip ring and the shroud 122.

Conventional robotic lawnmowers use a variety of mechanisms and methods to control the cutting path and cutting area, as well as propelling the lawnmower to and from the area in which the lawnmower is to be operated. Many of these same mechanisms and methods may be used to control the cutting path and cutting area of the vegetation cutting device of embodiments of the invention, as well as propelling the device to and from the area in which the device is to be operated. The device 110 may comprise an on-board central processing unit (CPU) or controller 160 to control the operation of the device 110. The controller 160 may comprise a microprocessor, dedicated or general purpose circuitry (such as an application-specific integrated circuit or a field-programmable gate array), a suitably programmed computing device, or any other suitable means for controlling the operation of the device. The device 110 may comprise a memory module 162 for storing programming instructions, cutting paths, etc.

The device 110 may comprise a sensor housing 126 located on top of the turret 121 (or in any other suitable location). The sensor housing 126 would typically have one or more windows 128 to enable the sensors (not illustrated) in the housing 126 to "see" the device's surroundings. Such sensors may include, e.g., cameras, radar, and/or lidar sensors. The device 110 may comprise a navigation system 170 (e.g., GPS) to control the path of the device. The device 110 may comprise a communications module 172 to enable the device 110 to communicate with a dedicated remote control unit 181 (described further below) or a general purpose computing device (e.g., tablet, laptop computer, smartphone) that is functioning as a remote control unit. Any suitable communication modality may be used, such as Bluetooth, Wi-Fi, and/or cellular. The device 110 may comprise a user interface 174, which may comprise any suitable combination of user inputs (e.g., on/off switch) and/or user outputs (e.g., battery status indicator).

A dedicated remote control unit 181 may be used to directly control the operation of the cutting device 110 and/or to program a predetermined path and/or predetermined boundaries of an area to be cut (such direct control and such programming of such a predetermined path and/or predetermined boundaries is conventionally known with existing robotic lawnmowers, bomb disposal robots, etc.). The remote control unit 181 may comprise an on-board central processing unit (CPU) or controller 182 to control the operation of the remote control unit 181. The controller 182 may comprise a microprocessor, dedicated or general purpose circuitry (such as an application-specific integrated circuit or a field-programmable gate array), a suitably programmed computing device, or any other suitable means for controlling the operation of the device. The remote control unit 181 may comprise a memory module 184 for storing programming instructions, cutting paths, etc. The remote control unit 181 typically comprises one or more batteries 186 to power the remote control unit 181. Any suitable number, type, and capacity of batteries may be used. The remote control unit 181 typically comprises a communications module 188 to enable the remote control unit 181 to communicate with the cutting device 110. Any suitable communication modality may be used, such as Bluetooth, Wi-Fi, and/or cellular. The remote control unit 181 may comprise a user interface 190, which may comprise any suitable combination of user inputs (e.g., on/off switch, joystick) and/or user outputs (e.g., battery status indicator).

Alternative embodiments of the device may comprise an 'air suspension' system or other mechanism to raise and lower the slip ring and turret as desired to adjust the cutting height.

The design of the vegetation cutting device of embodiments of the invention allows for aerial drone-like control possibilities enabling a wide array of deck control and grass cutting configurations that do not exist in existing mower deck designs.

The design of the vegetation cutting device of embodiments of the invention provides increased cutting efficiency as compared to conventional lawn mowers and the like. A 20 inch traditional mowing blade can mow an area of $pi*r^2=100*pi=314$ square inches before external force moves the blade across the yard (via human push or wheel motor). However, the same mower blade positioned on a rotating deck 20 inches from the centroid of the deck can mow an area defined by: $pi*30^2-pi*10^2=900*pi-100*pi=800*pi=2,512$ square inches given angular momentum (8× multiple).

The design of the vegetation cutting device of embodiments of the invention provides improved balanced with the center of gravity in the geometric centroid of the device, which reduces slope limitations that result from imbalances in conventional designs. The design of the vegetation cutting device of embodiments of the invention enables cutting to occur in circular arcs outside the drive system, unlike most conventional mowers which limit blade cutting space to between wheels (which is less efficient). The counter-rotating deck (i.e., opposite rotation than the blades) of the vegetation cutting device of embodiments of the invention enables the blade covers to serve as combs/rakes to help lift the grass prior to cutting. The drone-like control of the vegetation cutting device of embodiments of the invention allows variable voltage (magnitude and direction) to be applied to the cutting motors to dynamically suit the working environment. The turret rotation of the vegetation cutting device of embodiments of the invention provides airflow to cool the cutting motors.

For safer operation of the vegetation cutting device of embodiments of the invention, the cutting operation may occur while the device is not being propelled (i.e., tracks/wheels are stationary). In such a safer operation, the turret may rotate and the blades cut, then the device can move forward, then stop and cut again, then move forward again, and repeat this process.

The rate of turret rotation can be monitored (using any suitable rotational speed monitoring mechanism or method). The rate of turret rotation can provide information about the quality of the cut (e.g., slower rotation indicates more grass resistance, such as due to taller grass). This information can be used to control the speed at which the device moves along the ground, such that the device may move more slowly if there is higher grass resistance, and may even stop in place until the turret speed increases to indicate that the vegetation at the current position has been sufficiently cut.

The design of the vegetation cutting device of embodiments of the invention can provide multi-stage mowing with simultaneous cutting/chopping leaves/raking/hovering. The turret rotation allows only one blade for each function (12" covers 40+ inch width).

Putting the batteries in the base, separate from the cutting motors, will allow actual 'floating deck' behavior with a hovering blade. This can exploit the aerodynamic 'ground effect' with the right lightweight materials and motor selection.

Depending on grass resistance, the counter-rotation can also drive gears attached to a drive axle that self-propels the device forward. So the rotating deck can provide eight times the mowing coverage before external forces move the mower and the rotational kinetic energy can be used to move the mower forward (providing a win-win from an efficiency standpoint). When mowing autonomously, the radius of blade, offset, and drive gears can be engineered to ensure the mower's forward velocity slows in thick grass (naturally because blades will slow) and can accelerate over thin grass.

The optional ability to stop turret rotation combined with the pivoting cutting arms allows for nearly limitless configurations that can perform in most mowing scenarios. For example, mowing hills with the device in a ditch with the deck arms angled upward to mow the inclined sides.

The ability to pivot the cutting arms up and lock them in a raised position provides for efficient transportation and storage as the floor needed is limited to footprint of the base.

In alternative embodiments of the invention, the cutting blades could be replaced by other tools to perform other functions. As with the cutting blades, these other tools may be rotatable and would be mounted at the distal ends of the arms. The turret and arms would rotate relative to the base to provide alternative functionality. For example, alternative devices may function as sweeping, cleaning, polishing, or ice resurfacing devices. As such, the cutting blades may be replaced by brushes, polishing pads, scrapers, or any suitable tool (rotational or not) to provide the desired functionality.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A device for cutting vegetation comprising:
   a base capable of being selectively propelled about a surface upon which the device sits;
   a turret affixed to the base and rotatable relative to the base; and
   two or more vegetation cutting tools affixed to the turret;
   wherein the turret and cutting tools rotate together 360 degrees relative to the base as the base moves about the surface such that the cutting tools are adapted to cut vegetation on the surface;
   wherein each of the two or more vegetation cutting tools comprises a selectively rotatable cutting blade;
   wherein each of the two or more vegetation cutting tools comprises an electric motor that is selectively operable to selectively rotate the respective cutting blade;
   wherein each of the two or more vegetation cutting tools further comprises an elongated arm having a proximal end and a distal end;
   wherein the proximal end of each arm is affixed to the turret;

wherein each electric motor and each cutting blade are affixed at the distal end of a respective arm; and wherein, when the electric motors are operated, angular momentum of the motors causes the turret and cutting tools to rotate together relative to the base.

2. The device of claim 1, wherein the two or more vegetation cutting tools are spaced evenly apart about the turret.

3. The device of claim 1, further comprising a selectively operable turret rotation motor that, when operated, causes the turret and cutting tools to rotate together relative to the base.

4. The device of claim 1, wherein the proximal end of each arm is pivotably affixed to the turret such that each arm is capable of pivoting up and down.

5. The device of claim 4, further comprising one or more arm pivoting mechanisms, each arm pivoting mechanism configured to move a respective one of the arms up and down.

6. The device of claim 5, wherein each of the one or more arm pivoting mechanisms comprises an electric motor, a hydraulic cylinder, a pneumatic cylinder, or a linear actuator.

7. The device of claim 1, wherein the turret comprises an electrical slip ring having a fixed portion and a rotatable portion;

wherein the proximal end of each arm is affixed to the rotatable portion of the slip ring; and wherein the fixed portion of the slip ring is affixed to the base.

8. The device of claim 1, further comprising one or more spacers, each of the one or more spacers affixed below a respective cutting blade, the one or more spacers being adapted to contact the surface and maintain a minimum spacing between each respective cutting blade and the surface.

9. The device of claim 8, wherein each of the one or more spacers comprise one or more casters.

10. The device of claim 1, wherein the base comprises one or more propulsion motors for selectively propelling the base.

* * * * *